United States Patent
Wang (10) Patent No.: US 11,222,067 B2
(45) Date of Patent: Jan. 11, 2022

(54) MULTI-INDEX METHOD AND APPARATUS, CLOUD SYSTEM AND COMPUTER-READABLE STORAGE MEDIUM

(71) Applicant: Beijing Baidu Netcom Science and Technology Co., Ltd., Beijing (CN)

(72) Inventor: Huayong Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 326 days.

(21) Appl. No.: 16/130,236

(22) Filed: Sep. 13, 2018

(65) Prior Publication Data
US 2019/0171773 A1 Jun. 6, 2019

(30) Foreign Application Priority Data
Dec. 5, 2017 (CN) .......................... 201711271300.3

(51) Int. Cl.
G06F 16/20 (2019.01)
G06F 16/30 (2019.01)
G06F 16/90 (2019.01)
G06F 16/901 (2019.01)
G06F 16/23 (2019.01)
G06F 16/27 (2019.01)
G06F 16/31 (2019.01)

(52) U.S. Cl.
CPC .......... G06F 16/901 (2019.01); G06F 16/23 (2019.01); G06F 16/27 (2019.01); G06F 16/313 (2019.01)

(58) Field of Classification Search
None
See application file for complete search history.

(56) References Cited

U.S. PATENT DOCUMENTS 6,778,985 B1 * 8/2004 Jenkins, Jr. ............. G06F 16/30
8,745,034 B1 * 6/2014 Fuller ..................... G06F 16/24
707/716
9,633,074 B1 4/2017 Sharma et al.

FOREIGN PATENT DOCUMENTS

CN 102521303 A 6/2012
CN 103020204 A 4/2013
(Continued)

OTHER PUBLICATIONS

Fay Chang, Jeffrey Dean, Sanjay Ghemawat, Wilson C. Hsieh, Deborah A. Wallach, Mike Burrows, Tushar Chandra, Andrew Fikes, and Robert E. Gruber, Bigtable: A Distributed Storage System for Structured Data, Google, Inc., 2006, 14 pages.
(Continued)

Primary Examiner — Kristopher Andersen
(74) Attorney, Agent, or Firm — Kinney & Lange, P.A.

(57) ABSTRACT

A multi-index method and a multi-index apparatus for a cloud database, a cloud system, and a computer-readable storage medium are provided. The cloud database includes an index unit, and the multi-index method includes: storing multiple data values in a storage unit and acquiring storage address information of each of the data values in the storage unit; and storing a value of each of multiple index keywords corresponding to each data value in the index unit in association with the storage address information of the data value, so that the cloud database is indexed according to at least two of the multiple index keywords.

14 Claims, 5 Drawing Sheets

--- store multiple data values in a storage unit and acquire storage address information of each of the data values in the storage unit — S101 store a value of each of multiple index keywords corresponding to each data value in an index unit in association with the storage address information of the data value, so that the cloud database is indexed according to at least two of the multiple index keywords — S102

(56) References Cited

FOREIGN PATENT DOCUMENTS

| CN | 103150397 A | 6/2013 |
|---|---|---|
| CN | 104766024 A | 7/2015 |
| CN | 105408857 A | 3/2016 |
| CN | 105488050 A | 4/2016 |
| CN | 107239568 A | 10/2017 |

OTHER PUBLICATIONS

Improving Data Access with Secondary Indexes, https://docs.aws.amazon.com/amazondynamodb/latest/developerguide/SecondaryIndexes.html, Amazon, accessed Mar. 22, 2019, 4 pages.
Brad Calder, Ju Wang, Aaron Ogus, et al., Windows Azure Storage: A Highly Available Cloud Storage Service with Strong Consistency, Microsoft, Oct. 2011, 15 pages.
First Chinese Office Action dated Aug. 29, 2018, for corresponding Chinese Application No. 2017112713003.
Second Chinese Office Action dated Oct. 16, 2018, for corresponding Chinese Application No. 2017112713003.
Research On Database Security and Database Integrity Under Cloud Background, Yunjie, TU, Nov. 30, 2014.

\* cited by examiner

MULTI-INDEX METHOD AND APPARATUS, CLOUD SYSTEM AND COMPUTER-READABLE STORAGE MEDIUM

CROSS-REFERENCE TO RELATED APPLICATION(S)

This application claims priority to Chinese Patent Application No. 201711271300.3, filed on Dec. 5, 2017, which is hereby incorporated by reference in its entirety.

TECHNICAL FIELD

The present disclosure relates to the field of cloud computing, and in particular to a multi-index method and a multi-index apparatus for a cloud database, a cloud system, and a computer-readable storage medium.

BACKGROUND

In a cloud computing system, a cloud database plays an important role. Similar to a traditional database, the cloud database also stores several tables, each of which includes rows and columns. However, unlike a traditional database, the cloud database divides a table into multiple sections, each section being placed at a different node of the cloud system. For the convenience of query, multiple indexes are created for each table. However, in the cloud database, it is difficult to implement multiple indexes since data are distributed at different nodes.

In view of this, it is desirable to provide a multi-index mechanism for the cloud database.

SUMMARY

According to embodiments of the present disclosure, there are provided a multi-index method, a multi-index apparatus, a cloud system, and a computer-readable storage medium for solving at least one of the above technical problems in the existing technology.

In a first aspect, a multi-index method for a cloud database is provided according to an embodiment of the present disclosure, wherein the cloud database includes an index unit, the multi-index method includes: storing multiple data values in a storage unit and acquiring storage address information of each of the data values in the storage unit; and storing a value of each of multiple index keywords corresponding to each data value in the index unit in association with the storage address information of the data value, so that the cloud database is indexed according to at least two of the multiple index keywords.

In a second aspect, a multi-index apparatus for a cloud database is provided according to an embodiment of the present disclosure, wherein the cloud database includes an index unit, the multi-index apparatus includes: an acquiring means configured for storing multiple data values in a storage unit and acquiring storage address information of each of the data values in the storage unit; and a storing means configured for storing a value of each of multiple index keywords corresponding to each data value in the index unit in association with the storage address information of the data value, so that the cloud database is indexed according to at least two of the multiple index keywords.

The functions may be implemented by hardware, or also by hardware executing corresponding software. The hardware or software includes one or more modules corresponding to the above functions.

In a third aspect, a cloud system is provided according to an embodiment of the present disclosure, the cloud system includes: a storage unit configured for storing multiple data values written by a client device, and feeding storage address information of the multiple data values back to the client device; and a cloud database configured for storing a value of each of the multiple index keywords for each data value received from the client device in an index unit of the cloud database in association with the storage address information of the data value, so that the cloud database is indexed according to at least two of the multiple index keywords.

In a fourth aspect, a computer-readable storage medium is provided according to an embodiment of the present disclosure, the computer-readable storage medium stores a computer program, which, when executed by a processor, implements the information processing method as described above.

One of the above technical solutions has at least one of the following advantages or advantageous effects: data values and values of index keywords are stored respectively, such that an index table no longer contains data values, thereby reducing the size of a table stored in the database. The speed of searching for a data value is increased and the pressure of storage space is reduced. The multi-index mechanism of the cloud database can be supported. All the index tables can be updated simultaneously when a row is updated, and a transaction are used to ensure consistency.

The above summary is provided only for illustration, and is not intended to limit the disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION

Hereinafter, only some exemplary embodiments are simply described. As can be recognized by those skilled in the art, the described embodiments may be modified in various ways without departing from the spirit or scope of the present disclosure. Accordingly, the drawings and the description should be considered as illustrative in nature instead of being restrictive.

Stored in a cloud database is usually a complex table that includes multiple rows and columns. Table 1 below shows a data table including four rows and three columns.

TABLE 1

| first keyword | second keyword | data |
|---|---|---|
| 1 | AAA | xxx |
| 2 | CCC | yyy |
| 3 | BBB | zzz |

Data values can be continuous values, such as sounds, images, etc., or discrete values, such as symbols, characters, etc.

As shown in Table 1 above, the keywords corresponding to the data include a first keyword and a second keyword, and the data values are very long character strings, which are represented herein as xxx, yyy, and zzz.

The above data table of four rows and three columns is merely an example, and the present disclosure is not limited to this. It can be understood by those skilled in the art that the table stored in the cloud database according to the present disclosure may also include more rows and more columns, and that more columns may correspond to more index keywords.

Taking table 1 as an example, a row in which the first keyword is "1" and the second keyword is "AAA" may be found just by searching the above table 1 stored in the cloud database. Then, a corresponding data value is found through a pointer. Searching the above table stored in a storage unit is very simple since the table is sorted according to the first keyword and the second keyword. For example, firstly, a binary search is performed on the first keyword column to find a row in which the first keyword is "1". If there are multiple rows in which the first keyword is "1", then a binary search is performed on the second keyword column of these rows to find a row in which the second keyword is "AAA".

Assuming that the user needs to find a row in which the second keyword is "CCC", only using table 1 above would not be sufficient. This is because in the storage unit, the table is not sorted according to the second keyword, that is, the second column of the table is not sorted (AAA, CCC, BBB). Therefore, in order to find the row in which the second keyword is "CCC", the entire table has to be scanned, which is inefficient. In this case, it is required to create a second index.

The creating of the second index is in fact to create a new table which is called a simple table index, as follows:

TABLE 2

| second keyword | first keyword | data |
|---|---|---|
| AAA | 1 | xxx |
| BBB | 3 | zzz |
| CCC | 2 | yyy |

A first column of table 2 is the second keyword, a second column thereof is the first keyword, and a third column thereof is data. The order of the index keywords in table 2 is different from that in table 1, and the second keyword is placed in the first column. Although the rows in table 1 and table 2 are actually the same, the arrangement orders of the rows are different. Obviously, it is very easy to query the row in which the second keyword is "CCC" using the index in Table 2, just by performing a binary search on the first column of table 2. This is a basic idea of multi-index processing.

Data stored in the cloud database may be stored and indexed based on a multi-index method according to the embodiments of the present disclosure.

According to the embodiments of the present disclosure, there is provided a multi-index method for a cloud database. The cloud database includes an index unit.

Figure 1:
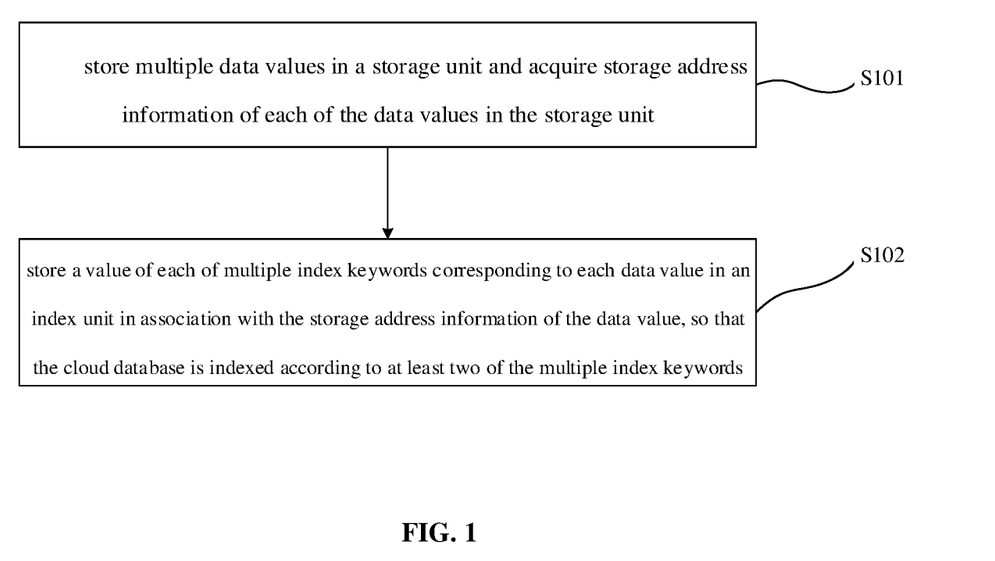
FIG. 1 is an exemplary flowchart of a multi-index method for a cloud database according to an embodiment of the present disclosure.

FIG. 1 is an exemplary flowchart of a multi-index method for a cloud database according to an embodiment of the present disclosure.

As shown in FIG. 1, a multi-index method according to an embodiment of the present disclosure includes the following steps S101-S102.

At step S101, multiple data values are stored in a storage unit, and storage address information of each data value in the storage unit is acquired.

At step S102, a value of each of multiple index keywords corresponding to each data value is stored in the index unit in association with the storage address information of the data value, so that the cloud database is indexed according to at least two of the multiple index keywords.

The multi-index method for a cloud database according to the embodiment of the present disclosure enables to store the data values and the values of the index keywords respectively.

According to an embodiment of the present disclosure, when creating an index for a cloud database, at step S101, multiple data values may be written into the storage unit by a client device, that is, multiple data values are stored in the storage unit, and the storage address information of each data value in the storage unit is acquired. The storage address information of the data value in the storage unit may be, for example, a pointer indicating an offset and a data length. A pointer may point to a corresponding data value, so that the data value can be found through the pointer in search for the data value. The present disclosure is not limited to this, and any information through which the corresponding data value can be found may be used as the storage address information according to an embodiment of the present disclosure.

According to an embodiment of the present disclosure, for example, a storage unit for storing data may be a permanent storage unit. Once data are written into the permanent storage unit, they will not be lost. For example, a storage unit for storing data may be one or several files in an underlying distributed file system, such as a Value Store, which provides permanent storage, that is, once data are written into the Value Store, they will not be lost. The Value Store may use multiple files for offloading, so the Value Store itself will not become a performance bottleneck. When a data value is written into a file in the Value Store, the storage address information of the data value, i.e., a pointer, may be obtained. The pointer usually includes the file name of the file in which the data value is stored, an offset, and a data length, and the data value can be found via "file name+ offset+data length" when it is used.

Next, at step S102, a value of each of multiple index keywords corresponding to each data value may be stored in the index unit in association with the storage address information of the data value. According to the present disclosure, the index unit may be located on a cloud database server, more specifically, at a node of the cloud database server. The pointer may be returned to the client device, the returned pointer may be transmitted by the client device to the cloud database server in association with a value of an index keyword corresponding to the data value, and the value of the index keyword received by the cloud database server may be stored in a storage device of the cloud database server in association with the corresponding pointer.

According to a preferred embodiment of the present disclosure, for example, before writing a value of an index keyword corresponding to a data value and storage address information of the data value into the index unit, the received value of the index keyword corresponding to the data value is written into another storage device in association with the storage address information of the data value so as to prevent data loss. The other storage device may be, for example, a Write-Ahead-Log, which is well known to those skilled in the art and will not be described in detail herein.

In addition, according to an embodiment of the present disclosure, the index unit may be implemented by, for example, a memory. For example, the cloud database server may firstly write into the memory the value of the index keyword and the storage address information in the form of a table, and then a background thread stores the contents of the stored table in a checkpoint file. The checkpoint file is typically able to permanently store information (such as via disk), that is, once the data is input into the checkpoint file, it will not be lost.

Figure 2:
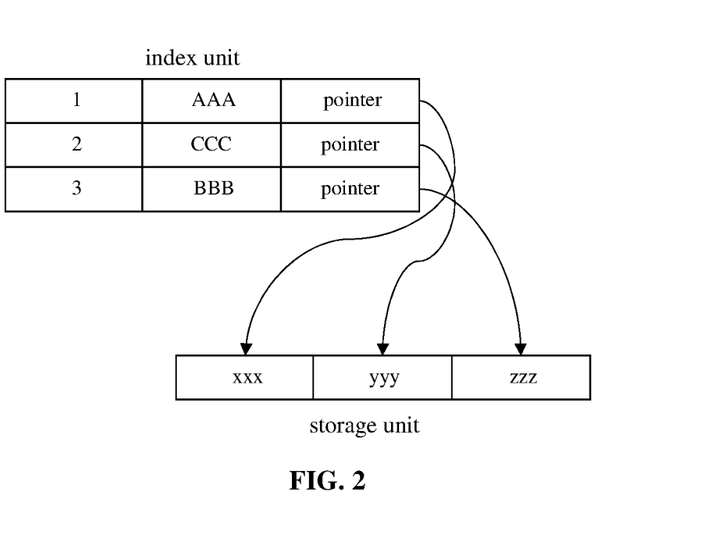
FIG. 2 shows an exemplary table respectively stored in a storage unit and in an index unit based on a multi-index method according to an embodiment of the present disclosure.

FIG. 2 shows an exemplary table respectively stored in a storage unit and in an index unit based on a multi-index method according to an embodiment of the present disclosure.

Taking the data stored in table 1 as described above as an example, as shown in FIG. 2, the data values xxx, yyy, and zzz shown in the above table 1 are stored in the storage unit, and a value of an index keyword corresponding to a data value and a pointer pointing to the data value are stored in the index unit in association with each other. As shown in FIG. 2, the information stored in the index unit does not include a data value itself, but includes a pointer pointing to the data value in the storage unit.

By storing a data value and a value of its index keyword separately as described above, the table stored in the index unit, containing the value of the associated index keyword and a pointer pointing to the data value is used as an index. Since the size of the pointer is usually much smaller than the data value itself, the table stored in the database is usually small, so that the speed of searching for subsequent data can be increased, and the pressure of the storage space is reduced.

According to an embodiment of the present disclosure, the index unit may include multiple index subunits.

At step S102, storing a value of each of multiple index keywords corresponding to each data value in association with the storage address information of the data value includes: storing in each of the multiple index subunits a value of each of multiple index keywords corresponding to each data value in association with the storage address information of the data value. According to an embodiment of the present disclosure, each of the multiple index subunits may be a storage device located at each of multiple cloud server nodes.

The multi-index method of the present disclosure is described hereinafter by an example in which the multiple index subunits include two index subunits and the multiple index keywords of data values include two index keywords.

According to one embodiment of the disclosure, the multiple index keywords of each data value include a first index keyword and a second index keyword.

At step S102, storing a value of each of multiple index keywords corresponding to each data value in association with the storage address information of the data value includes: storing the storage address information of the data value in a first index subunit of the index unit in association with a value of the first index keyword corresponding to the data value, in a first predetermined order based on the first keyword; and storing the storage address information of the data value in a second index subunit of the index unit in association with a value of the second index keyword corresponding to the data value, in a second predetermined order based on the second keyword.

Figure 3:
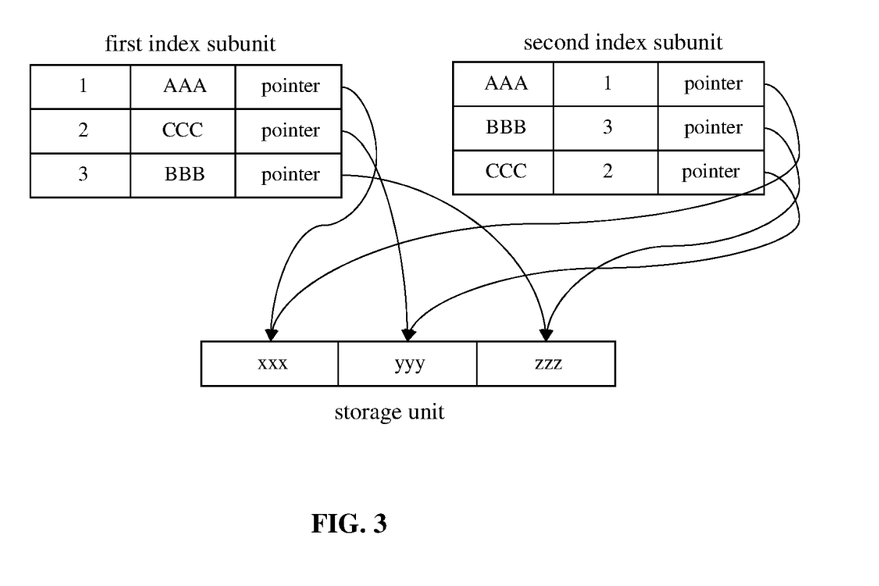
FIG. 3 shows another exemplary table respectively stored in a storage unit and in an index unit based on a multi-index method according to an embodiment of the present disclosure.

FIG. 3 shows another exemplary table respectively stored in the storage unit and in the index unit based on the multi-index method according to an embodiment of the present disclosure.

Still taking the data stored in table 1 as described above as an example, as shown in FIG. 3, the data values xxx, yyy, and zzz shown in the above table 1 are stored in the storage unit; a value of the first index keyword corresponding to a data value and a pointer pointing to the data value are stored in the first index subunit in association with each other, wherein values of the first index keyword corresponding to the data values and the pointers pointing to the data values are stored sequentially according to the first index keyword; and a value of the second index keyword corresponding to a data value and a pointer pointing to the data value are stored in the second index subunit in association with each other, wherein values of the second index keyword corresponding to the data values and the pointers pointing to the data values are stored sequentially according to the second index keyword.

As shown in FIG. 3, the tables stored in the first index subunit and the second index subunit do not include data values, but both point to the data values in the storage unit through the same pointers. According to the embodiment of the present disclosure, only one copy of data values (such as xxx, yyy, zzz) is finally stored, and each of the two index subunits points to these data values through the pointers.

Figure 4:
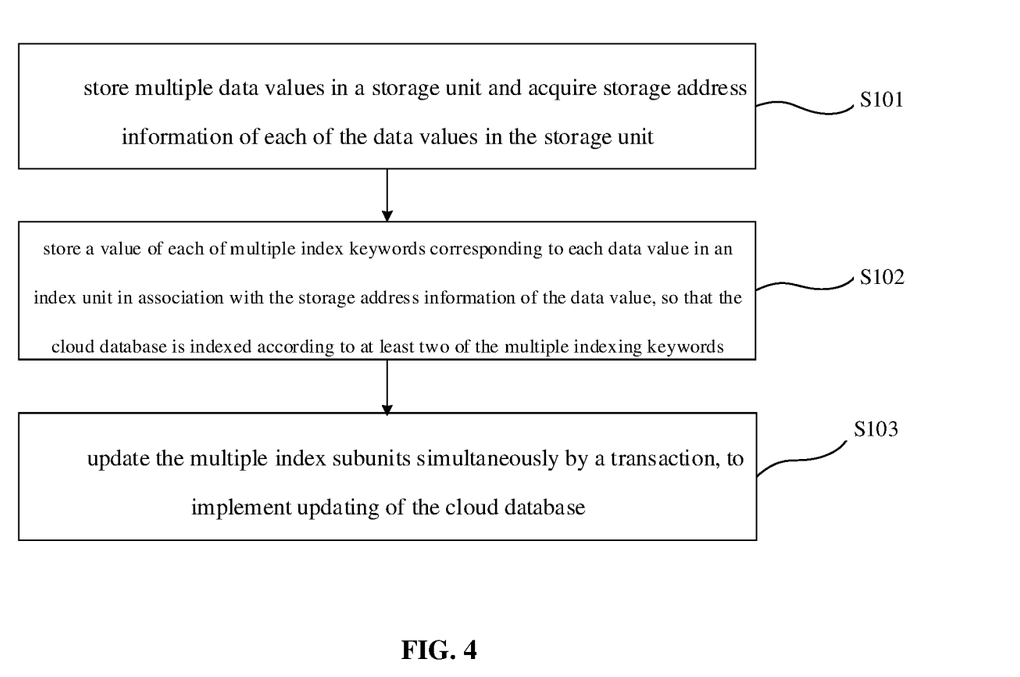
FIG. 4 shows an exemplary flowchart of a multi-index method for a cloud database according to another embodiment of the present disclosure.

FIG. 4 shows an exemplary flowchart of a multi-index method for a cloud database according to another embodiment of the present disclosure.

As shown in FIG. 4, a multi-index method for a cloud database according to another embodiment of the present disclosure includes, in addition to steps S101 and S102 shown in FIG. 1, a step S103, in which the multiple index subunits are updated simultaneously by a transaction, so as to implement updating of the cloud database.

In the case of multiple indexes, when a new data value needs to be written to update the database after the indexes are formed, the new data value may be written into the storage unit firstly, and then a value of each of the multiple index keywords corresponding to the new data value is written into each of multiple index subunits in association with the storage address information of the new data value in the storage unit. Moreover, it can be ensured that the write operations in multiple index subunits succeed or fail simultaneously by a transaction. The process for ensuring that the write operations in multiple index subunits succeed or fail simultaneously by a transaction is known to those skilled in the art, and will not be described in detail herein.

Through the above processes, it can be ensured that when new data needs to be written, the index tables stored in all the index subunits in the database are updated at the same time, thus ensuring the consistency of the index tables stored in the index subunits.

Figure 5:
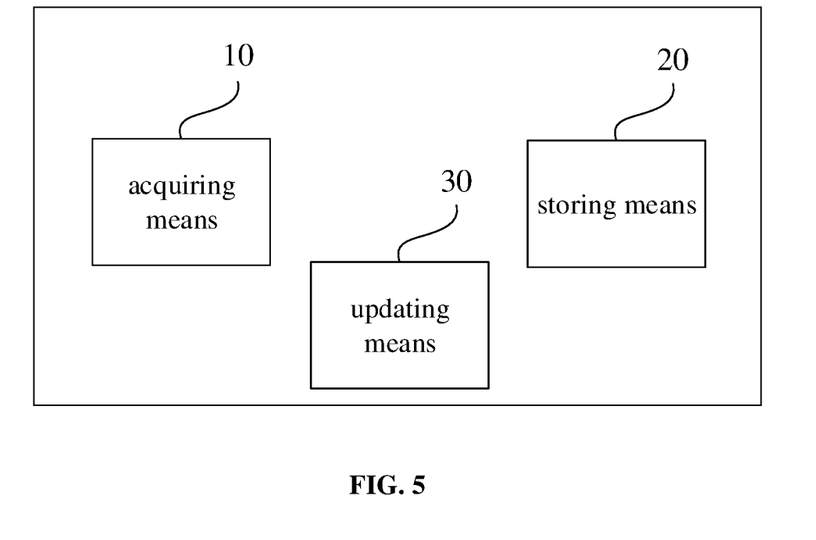
FIG. 5 shows an exemplary structure of a multi-index apparatus for a cloud database according to an embodiment of the present disclosure.

According to an embodiment of the present disclosure, there is also provided a multi-index apparatus for a cloud database. The cloud database includes an index unit. As shown in FIG. 5, the multi-index apparatus includes: an acquiring means 10 configured for storing multiple data values in the storage unit and acquiring storage address information of each of the data values in the storage unit; and a storing means 20 configured for storing a value of each of multiple index keywords corresponding to each data value in the index unit in association with the storage address information of the data value, so that the cloud database is indexed according to at least two of the multiple index keywords.

According to an embodiment of the present disclosure, the index unit may include multiple index subunits. The storing means 20 may be configured for storing a value of each of multiple index keywords corresponding to each data value in each of the multiple index subunits in association with the storage address information of the data value.

According to an embodiment of the present disclosure, the multi-index apparatus may further include an updating means 30 configured for simultaneously updating the multiple index subunits by a transaction, so as to implement updating of the cloud database.

According to an embodiment of the present disclosure, the multiple index keywords of each data value include a first index keyword and a second index keyword. The storing means 20 is configured for storing storage address information of each data value in a first index subunit of the index unit in association with a value of the corresponding first index keyword in a first predetermined order; and storing storage address information of each data value in a second index subunit of the index unit in association with a value of the corresponding second index keyword in a second predetermined order.

According to an embodiment of the present disclosure, the processes of the acquiring means 10, the storing means 20 and the updating means 30 can be made by reference to the processes of steps S101, S102 and S103 described in connection with FIGS. 1-4, and details are not described herein again.

Figure 6:
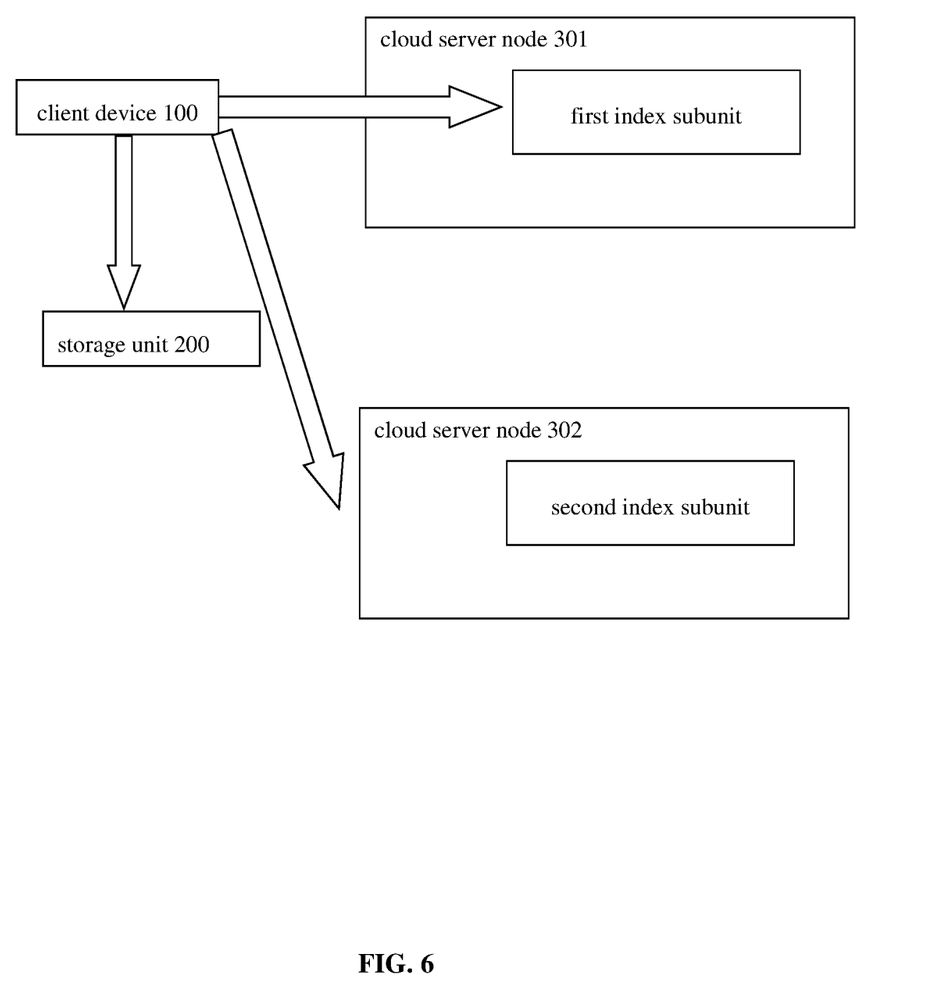
FIG. 6 shows an exemplary structure of a cloud system according to an embodiment of the present disclosure.

According to an embodiment of the present disclosure, there is further provided a cloud system. As shown in FIG. 6, the cloud system includes: a client device 100 configured for inputting multiple data values and values of multiple index keywords for each of the data values; a storage unit 200 configured for storing multiple data values written by the client device, and feeding storage address information of the multiple data values back to the client device; and a cloud database configured for storing a value of each of the multiple index keywords for each data value received from the client device in an index unit of the cloud database in association with the storage address information of the data value, so that the cloud database is indexed according to at least two of the multiple index keywords.

As shown in FIG. 6, according to an embodiment of this disclosure, the cloud database includes two cloud server nodes 301, 302, wherein each cloud server node is configured for storing each of the multiple index keywords for each data value received from the client device in an index subunit of the cloud server node in association with the storage address information of the data value. Although the example cloud database includes only two cloud server nodes, as shown in FIG. 6, the present disclosure is not limited to this. It can be understood by those skilled in the art that the cloud database according to the embodiment of the present disclosure may include more cloud server nodes.

The operation of storing data values by the storage unit 200 and the operation of storing values of multiple index keywords corresponding to the data values in association with the address information of the data values by the cloud database are similar to the processes of steps S101 and S102 described above in connection with FIG. 1, and a detailed description thereof is omitted herein.

Figure 7:
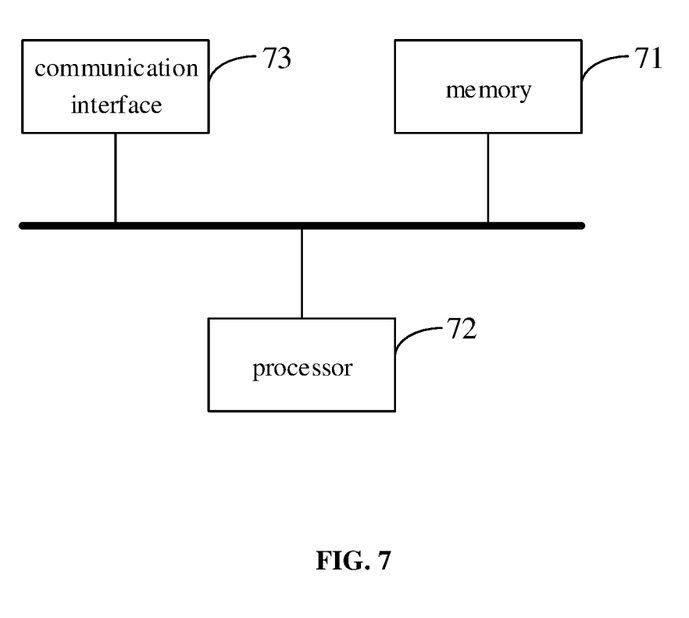
FIG. 7 is a schematic diagram of a server according to an embodiment of the present disclosure.

A server is provided according to an embodiment of the present disclosure. As shown in FIG. 7, the server includes a memory 71 and a processor 72. A computer program that can run on the processor 72 is stored in the memory 71. The computer program, when executed by the processor 72, implements a multi-index method for a cloud database according to the embodiments of the disclosure. The number of each of the memory 71 and the processor 72 may be one or more.

The server also includes: a communication interface 73, configured to enable the memory 71 and the processor 72 to communicate with an external device.

The memory 71 may include a high-speed RAM memory, or may also include a non-volatile memory, such as at least one disk memory.

If the memory 71, the processor 72 and the communication interface 73 are implemented independently, the memory 71, the processor 72 and the communication interface 73 may be connected to each other via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus or the like. For ease of illustration, only one bold line is shown in FIG. 7 to represent the bus, but it does not mean that there is only one bus or only one type of bus.

Optionally, in a specific embodiment, if the memory 71, the processor 72 and the communication interface 73 are integrated on one chip, then the memory 71, the processor 72 and the communication interface 73 can complete mutual communication through an internal interface.

The server may be used as a multi-index apparatus for a cloud database.

According to an embodiment of the present disclosure, there is further provided a computer-readable storage medium in which a computer program is stored, the computer program, when executed by a processor, implements the information processing method as described above.

As compared to the existing technology, a multi-index method, a multi-index apparatus, a cloud system, and a computer-readable storage medium according to the embodiments of the disclosure have at least one of the following advantages: data values and values of index keywords are stored respectively, such that an index table no longer contains data, thereby reducing the size of table stored in the database; the speed of the searching for a data value is increased and the required storage space is reduced; the multi-index mechanism of the cloud database can be supported; all the index tables can be updated simultaneously when a row is updated, and a transaction is used to ensure consistency.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the disclosure. Moreover, the specific features, structures, materials, or characteristics described may be combined in a suitable manner in any one or more embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as a module, segment or portion of code representing executable instructions including one or more steps for implementing a particular logical function or process. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logic and/or steps represented in the flowchart or otherwise described herein for example may be considered as an ordered list of executable instructions for implementing logical functions. They can be specifically embodied in any computer-readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer-readable medium" can be any means that can contain, store, communicate, propagate or transmit programs for use by an instruction execution system, apparatus or device or for use in conjunction with the instruction execution system, apparatus or device.

The computer-readable medium described in the embodiments of the disclosure may a computer-readable signal medium or a computer-readable storage medium or any combination of a computer-readable signal medium and a computer-readable storage medium. More specific examples (non-exhaustive list) of computer-readable storage medium at least include: an electrical connection part (electronic device) having one or more wires, a portable computer disk cartridge (magnetic device), random access memory (RAM), read only memory (ROM), an erasable programmable read-only memory (EPROM or flash memory), a fiber optic device, and a portable read only memory (CDROM). In addition, the computer-readable storage medium may even be a paper or other suitable medium on which the program can be printed. This is because for example the paper or other medium can be optically scanned, and then be edited, interpreted or, if necessary, processed in other suitable ways so as to obtain the program electronically, which are then stored in a computer memory.

In an embodiment of the disclosure, the computer-readable signal medium may include a data signal propagating in a baseband or as a part of a carrier, in which computer-readable program codes are carried. Such propagating data signal can take a variety of forms including, but not limited to, electromagnetic signal, optical signal, or any suitable combination of the electromagnetic signal and optical signal. The computer-readable signal medium may also be any computer-readable medium other than a computer-readable storage medium, and the computer-readable medium can send, propagate or transmit a program for use by an instruction execution system, an input method, or a device or for use in conjunction with an instruction execution system, an input method, or a device. The program codes embodied in the computer-readable medium can be transmitted by any suitable medium, including but not limited to: wireless, wire, optic cable, radio frequency (RF), etc., or any suitable combination of the foregoing.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: a discrete logic circuit having a logic gate circuit for implementing a logic function on a data signal, an application-specific integrated circuit having a suitable combined logic gate circuit, a programmable gate array (PGA), a field programmable gate array (FPGA), etc.

Those skilled in the art may understand that all or some of the steps carried in the method of the foregoing embodiments may be implemented by using a program to instruct the relevant hardware, and the program may be stored in a computer-readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be subject to the scope of the appended claims.

What is claimed is:

1. A multi-index method for a cloud database server, implemented by circuits for implementing functions, which includes an index unit implemented in one or more computer-readable memory, the cloud database server communicatively connected to an electronic client device communicatively connected to an electronic computer-readable storage unit, the multi-index method comprising:

receiving and storing multiple data values written by the electronic client device in an electronic computer-readable storage unit, and acquiring storage address information of each of the multiple data values in the electronic computer-readable storage unit; wherein, the electronic client device is configured for inputting the multiple data values to the electronic computer-readable storage unit, receiving storage address information of the multiple data values from the electronic computer-readable storage unit, and inputting values of multiple index keywords for each of the multiple data values and the storage address information of the multiple data values to the cloud database server; and storing a value of each of the multiple index keywords corresponding to each data value received from the electronic client device in association with the storage address information of the data value received from the electronic client device, in the index unit, so that the cloud database server is indexed according to at least two of the multiple index keywords.

2. The multi-index method of claim 1, wherein the index unit comprises multiple index subunits implemented in the one or more computer-readable memory; and wherein storing the value of each of multiple index keywords corresponding to each data value received from the electronic client device, in association with the storage address information of the data value received from the electronic client device in the index unit comprises: storing the value of each of multiple index keywords corresponding to each data received from the electronic client device, in association with the storage address information of the data value received from the electronic client device, in each of the multiple index subunits.

3. The multi-index method of claim 2, further comprising:

updating the multiple index subunits simultaneously by a transaction, so as to implement updating of the cloud database server.

4. The multi-index method of claim 1, wherein the multiple index keywords corresponding to each data value comprise a first index keyword and a second index keyword.

5. The multi-index method of claim 4, wherein storing the value of each of multiple index keywords corresponding to each data value received from the electronic client device in association with the storage address information of the data value received from the electronic client device, in the index unit comprises: storing storage address information of each data value received from the electronic client device in a first index subunit of the index unit implemented in the one or more computer-readable memory, in association with a value of the first index keyword corresponding to the data value, in a first predetermined order based on the first keyword; and storing storage address information of each data value received from the electronic client device in a second index subunit of the index unit implemented in the one or more computer-readable memory in association with a value of the second index keyword corresponding to the data value, in a second predetermined order based on the second keyword.

6. A multi-index apparatus for a cloud database server implemented by circuits for implementing functions, which includes an index unit implemented in one or more computer-readable memory, the cloud database server communicatively connected to an electronic client device, and the electronic client device communicatively connected to an electronic computer-readable storage unit, the multi-index apparatus comprising:

an acquiring means, implemented by one or more processors executing instructions stored in the one or more computer-readable memory, configured for receiving and storing multiple data values written by an electronic client device in an electronic computer-readable storage unit and acquiring storage address information of each of the data values in the storage unit, wherein, the electronic client device is configured for inputting the multiple data values to the electronic computer-readable storage unit, receiving storage address information of the multiple data values from the electronic computer-readable storage unit, and inputting values of multiple index keywords for each of the multiple data values and the storage address information of the multiple data values to the cloud database server; and a storing means, implemented by the one or more processors executing instructions stored in the one or more computer-readable memory, configured for storing a value of each of the multiple index keywords corresponding to each data value received from the electronic client device in association with the storage address information of the data value received from the electronic client device, in the index unit, so that the cloud database server is indexed according to at least two of the multiple index keywords.

7. The multi-index apparatus of claim 6, wherein the index unit comprises multiple index subunits implemented in the one or more computer-readable memory; and wherein the storing means is configured for storing the value of each of multiple index keywords corresponding to each data value in association with the storage address information of the data value, in the multiple index subunits.

8. The multi-index apparatus of claim 7, further comprising an updating means, implemented by the one or more processors executing instructions stored in the one or more computer-readable memory, configured for updating the multiple index subunits simultaneously by a transaction, so as to implement updating of the cloud database server.

9. The multi-index apparatus of claim 6, wherein the multiple index keywords corresponding to each data value comprise a first index keyword and a second index keyword.

10. The multi-index apparatus of claim 9, wherein the storing means is configured for storing storage address information of each data value in a first index subunit of the index unit implemented in the one or more computer-readable memory in association with a value of the first index keyword corresponding to the data value, in a first predetermined order based on the first keyword; and storing storage address information of each data value in a second index subunit of the index unit implemented in the one or more computer-readable memory in association with a value of the second index keyword corresponding to the data value, in a second predetermined order based on the second keyword.

11. A cloud system, implemented by circuits for implementing functions, comprising: an electronic client device, an electronic computer-readable storage unit, and a cloud database server, the electronic client device communicatively connected to the electronic computer-readable storage unit, and the electronic client device communicatively connected to the cloud database server;

the electronic client device configured for inputting multiple data values to the electronic computer-readable storage unit, receiving storage address information of the multiple data values from the electronic computer-readable storage unit, and inputting values of multiple index keywords for each of the multiple data values and the storage address information of the multiple data values to the cloud database server;

the electronic computer-readable storage unit configured for receiving and storing the multiple data values written by the electronic client device, and feeding the storage address information of the multiple data values back to the electronic client device; and the cloud database server, implemented in one or more computer-readable memory, configured for storing a value of each of the multiple index keywords for each data value received from the electronic client device in an index unit of the cloud database server implemented in the one or more computer-readable memory in association with the storage address information of the data value received from the electronic client device, so that the cloud database server is indexed according to at least two of the multiple index keywords.

12. The cloud system of claim 11, wherein the index unit comprises multiple index subunits implemented in the one or more computer-readable memory, and the value of each of multiple index keywords corresponding to each data value is stored in each of the multiple index subunits in association with the storage address information of the data value.

13. The cloud system of claim 11, wherein the multiple index keywords corresponding to each data value comprise a first index keyword and a second index keyword, and the index unit comprises a first index subunit and a second index subunit implemented in the one or more computer-readable memory; and wherein the first index subunit is configured for storing storage address information of each data value in association with a value of the first index keyword corresponding to the data value, in a first predetermined order based on the first keyword; and the second index subunit is configured for storing storage address information of each data value in association with a value of the second index keyword corresponding to the data value, in a second predetermined order based on the second keyword.

14. A non-transitory computer-readable storage medium storing a computer program, wherein the computer program, when executed by a processor, implements operations of:

receiving and storing multiple data values written by an electronic client device in an electronic computer-readable storage unit, and acquiring storage address information of each of the multiple data values in the electronic computer-readable storage unit; wherein, the electronic client device is communicatively connected to the electronic computer-readable storage unit, and the electronic client device is communicatively connected to a cloud database server that is implemented by circuits for implementing functions; the electronic client device is configured for inputting the multiple data values to the electronic computer-readable storage unit, receiving storage address information of the multiple data values from the electronic computer-readable storage unit, and inputting values of multiple index keywords for each of the multiple data values and the storage address information of the multiple data values to the cloud database server; and storing a value of each of the multiple index keywords corresponding to each data value received from the electronic client device in association with the storage address information of the data value received from the electronic client device, in the index unit, so that the cloud database server is indexed according to at least two of the multiple index keywords.

* * * * *